United States Patent [19]

Murphy et al.

[11] Patent Number: 4,594,761
[45] Date of Patent: Jun. 17, 1986

[54] METHOD OF FABRICATING HOLLOW COMPOSITE AIRFOILS

[75] Inventors: Guy C. Murphy; Jackie D. Jones, both of Fairfield; Charles T. Salemme, Madeira, all of Ohio

[73] Assignee: General Electric Company, Cincinnati, Ohio

[21] Appl. No.: 579,631

[22] Filed: Feb. 13, 1984

[51] Int. Cl.[4] .............................................. B23P 15/04
[52] U.S. Cl. ......................... 29/156.8 R; 29/156.8 B; 29/156.8 H; 29/418; 29/448; 29/463; 29/DIG. 16; 415/208; 416/229 A
[58] Field of Search .................. 29/156.8 B, 156.8 H, 29/156.8 R, 156.8 T, 418, 448, 463, DIG. 16; 415/200, 208, 216; 416/213, 224, 226, 229 A

[56] References Cited

U.S. PATENT DOCUMENTS

| | | | |
|---|---|---|---|
| 2,641,439 | 6/1953 | Williams | 29/156.8 B X |
| 3,058,202 | 10/1962 | Stalker | 29/156.8 H |
| 3,132,841 | 5/1964 | Wilder, Jr. | 416/224 |
| 3,357,850 | 12/1967 | Baker | 29/156.8 B X |
| 3,365,124 | 1/1968 | Burge et al. | 29/115 |
| 3,442,442 | 5/1969 | Seiwert | 415/200 |
| 3,588,267 | 6/1971 | Turnditch | 416/216 X |
| 3,623,204 | 11/1971 | Wagle | 29/156.8 B X |
| 3,627,443 | 12/1971 | Pirzer | 416/90 R |
| 3,886,647 | 6/1975 | Alexander | 416/224 X |
| 3,903,578 | 9/1975 | Rothman | 29/156.8 H |
| 3,981,616 | 9/1976 | Stargardter et al. | 416/226 X |
| 4,221,539 | 9/1980 | Corrigan | 416/229 A X |
| 4,301,584 | 11/1981 | Dillner et al. | 29/156.8 B |
| 4,492,522 | 1/1985 | Rossmann et al. | 415/200 X |

OTHER PUBLICATIONS

AIAA-81-1356 "Processing for an Improved Impact Resistant Composite Blade" by G. C. Murphy—AIAA/SAE/ASME 17th Joint Propulsion Conference—Jul. 27-29, 1981 (Title thru 7 pages).

Primary Examiner—Mark Rosenbaum
Assistant Examiner—Ronald S. Wallace
Attorney, Agent, or Firm—Stephen S. Strunck; Derek P. Lawrence

[57] ABSTRACT

A hollow composite airfoil with an integral internal support rib of fluoroelastomer rubber is formed by bracketing the rib between two silicone rubber mandrels to form a core assembly having a desired aerodynamic shape, then building up on opposite sides of the core assembly separate stacks of laminae of a composite material of graphite (or carbon) and glass fibers impregnated with an epoxy resin, with the two stacks overlapping adjacent to the leading and trailing edges of the core assembly. Heat and pressure are then applied to the core assembly with the laminae thereon to bond together the laminae of each stack, then to bond the two stacks together along the overlapping portions thereof and to bond the two stacks to the rib to form a continuous shell around the core assembly. The mandrels are then removed. One open end of the resulting hollow airfoil is plugged and that end is inserted into a recess in a mounting platform with a predetermined clearance space therebetween. An elastomeric material is then injected into the clearance space for filling it, the elastomer then being cured to bond the platform to the airfoil. A polyurethane sheath is wrapped around the airfoil and cured. Airfoils with plural ribs are also disclosed.

18 Claims, 14 Drawing Figures

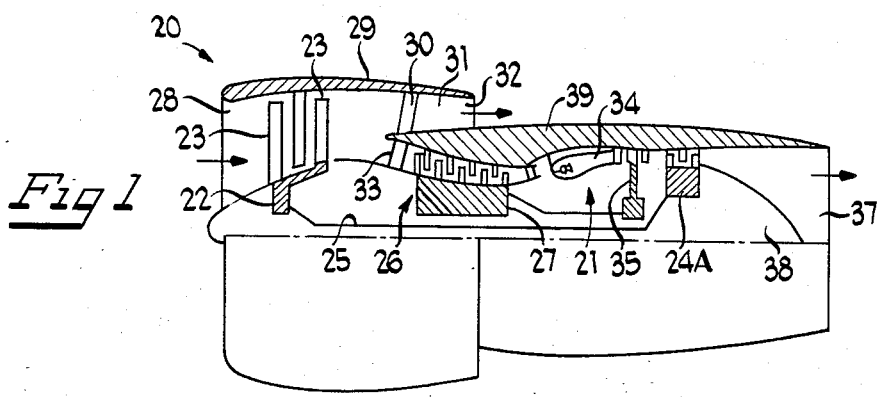
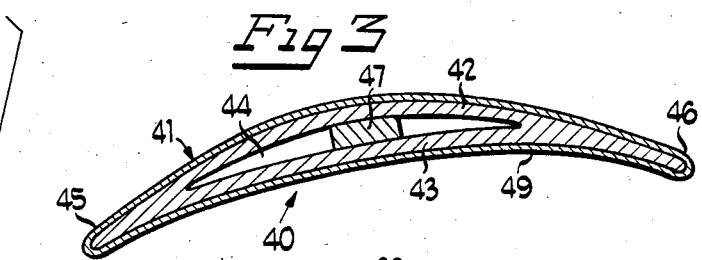
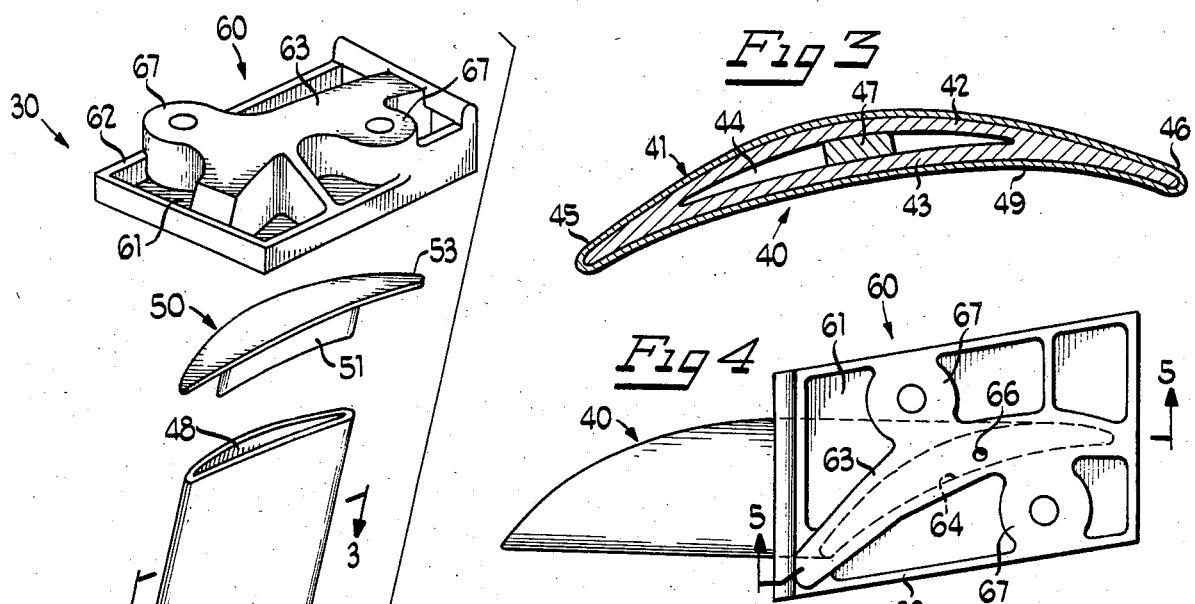
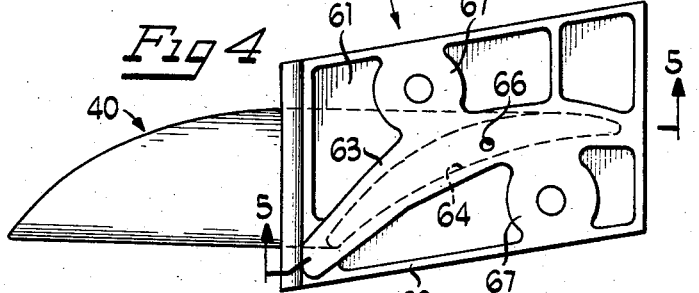
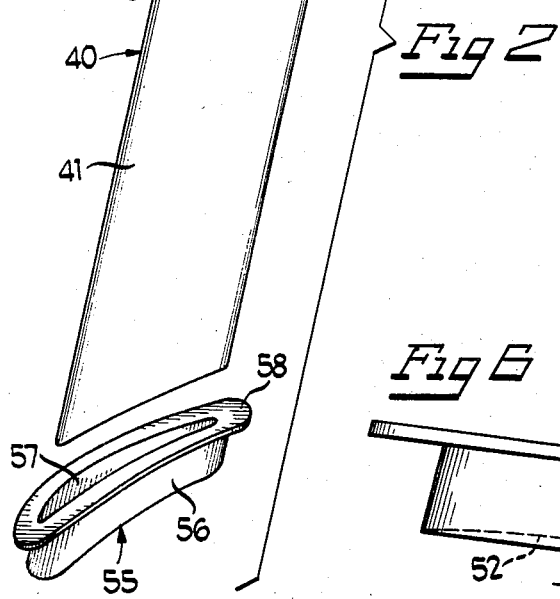
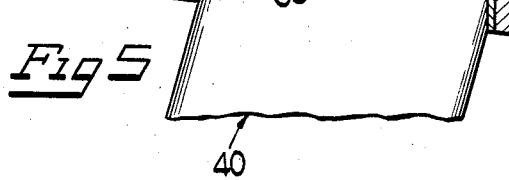
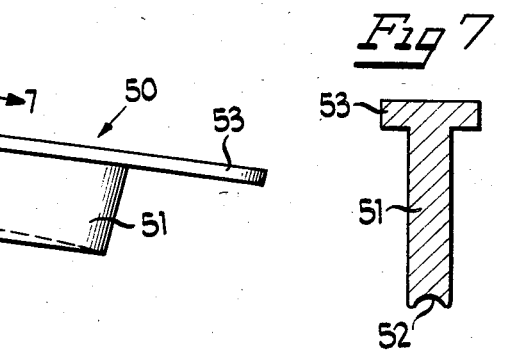

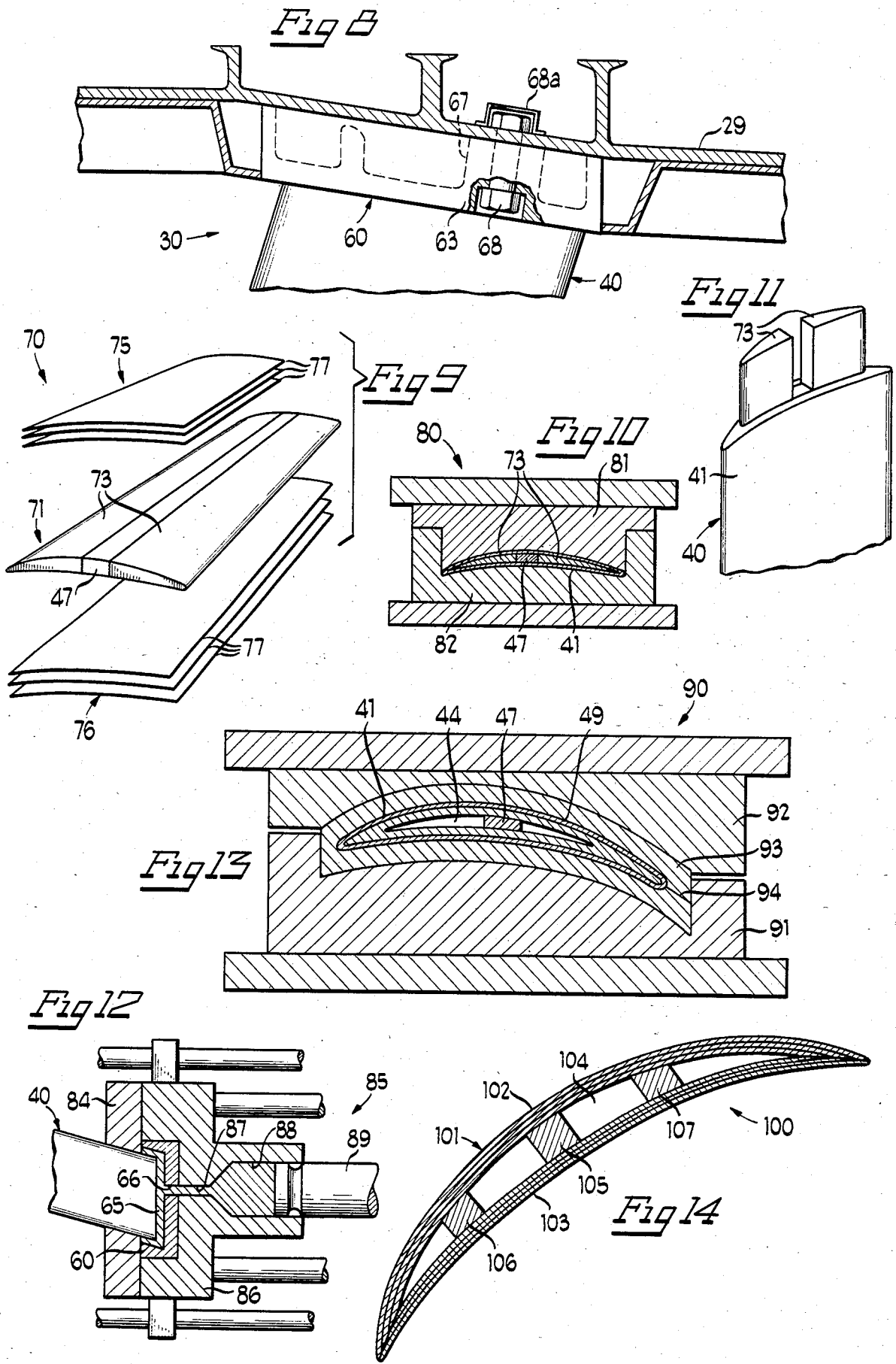

4,594,761

METHOD OF FABRICATING HOLLOW COMPOSITE AIRFOILS

CROSS-REFERENCE TO RELATED APPLICATIONS

The invention disclosed and claimed in this application is related to the invention disclosed and claimed in application Ser. No. 06,579,632 filed on even date hereof.

BACKGROUND OF THE INVENTION

The present invention relates to airfoils such as blades, vanes, struts or the like with aerodynamic surfaces, and to a method of fabricating such blades, vanes or struts. The invention has particular application to vanes of the type utilized in gas turbines used for aircraft propulsion.

Blades, vanes and struts of various airfoil design are commonly used in gas turbine engines. Typically, such blades, vanes or struts are solid members, since this affords the greatest combination of strength and ease of fabrication. However, a critical consideration in aircraft engine construction is weight reduction, which militates against the use of solid structural members. Accordingly, it is known to provide hollow blades, vanes or struts for such applications.

Since hollow airfoils do not have the same structural strength or stiffness as solid airfoils, it is necessary to provide hollow airfoils with some type of support such as stiffening ribs or the like. Heretofore, hollow airfoils with internal support structures have been disclosed, for example, in U.S. Pat. Nos. 3,365,124; 3,627,443 and 4,221,539. The construction of such hollow airfoils is relatively costly and complex. Typically, the airfoil is formed in two parts or halves, with the internal ribs being formed unitarily with one or both halves and joined together by suitable bonding techniques. Alternatively, the hollow airfoil shell would have to be fabricated first and then the internal rib structure inserted thereinto and bonded thereto.

Another important consideration in airfoils for turbo machinery is vibration damping. Such damping has been provided, for example, by external sheathing of the airfoil, as disclosed in U.S. Pat. No. 3,357,850. Such external sheathing necessitates additional manufacturing steps and can significantly increase the cost of the finished airfoil.

SUMMARY OF THE INVENTION

It is a general object of this invention to provide an improved hollow airfoil construction and method of fabricating same, which avoids the disadvantages of prior airfoil constructions and methods of fabrication while affording additional structural and operating advantages.

An important object of the invention is the provision of a novel hollow airfoil which is of relatively simple and economical construction.

Another object of the invention is the provision of a hollow airfoil of the type set forth, which has adequate structural strength while affording good vibration damping.

In connection with the foregoing objects, it is another object of this invention to provide a method of fabricating such a hollow airfoil which is simple and economical.

In connection with the foregoing object, it is yet another object of the invention to provide a method of the type set forth which minimizes fabrication steps.

Yet another object of the invention is to provide a method for joining a hollow composite airfoil to a mounting platform.

These and other objects of the invention are attained by providing an airfoil construction comprising: a hollow shell of a first material, the shell having two walls interconnected along their leading and trailing ends and spaced apart between the leading and trailing ends, and a solid rib of a second material disposed between the walls and integral with each and spaced from the interconnected ends thereof.

These and other objects of the invention are further attained by providing a method of fabricating a hollow airfoil comprising the steps of: providing a core assembly including an elongated support structure of one material and plural elongated mandrels of another material abutting the support structure and cooperating therewith to define the core assembly, then applying a shell around the core assembly encompassing the core assembly except at the ends thereof and contacting the support structure, then bonding the shell only to the support structure, and then removing the mandrels through an open end of the shell leaving a hollow shell with an integral internal support structure.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 1 is a simplified cross-sectional view, in partial cutaway, of an aircraft gas turbofan, including outlet guide vanes incorporating the features of the present invention;

FIG. 2 is an exploded perspective view of a vane assembly constructed in accordance with and embodying the features of the present invention;

FIG. 3 is an enlarged sectional view taken along the line 3—3 in FIG. 2;

FIG. 4 is a perspective view of the vane assembly of FIG. 2 in assembled condition;

FIG. 5 is a fragmentary sectional view taken along the line 5—5 in FIG. 4;

FIG. 6 is an enlarged side elevational view of the end plug of the vane assembly of FIG. 2;

FIG. 7 is a further enlarged view in vertical section taken along the line 7—7 in FIG. 6;

FIG. 8 is an enlarged fragmentary view of the upper portion of the outlet guide vane assembly of FIG. 3, shown mounted in place in a turbofan;

FIG. 9 is a perspective exploded view illustrating a preform, assembly of which is the first step in the fabrication of the vane assembly of FIG. 2;

FIG. 10 is a sectional view of a mold assembly for joining the parts of the preform assembly illustrated in FIG. 9;

FIG. 11 is an enlarged, fragmentary perspective view illustrating a step in the formation of the core assembly of the present invention;

FIG. 12 is a fragmentary sectional view of an apparatus for bonding the vane to a mounting platform;

FIG. 13 is an enlarged sectional view of a press mechanism for applying a sheath to the vane; and FIG. 14 is a fragmentary sectional view, similar to FIG. 3, of an alternative embodiment of the vane of the present invention.

DESCRIPTION OF THE PREFERRED EMBODIMENTS

Referring to FIG. 1 of the drawings, there is diagrammatically illustrated a gas turbofan engine, generally designated by the numeral 20. While it is recognized that turbofan engines are well known in the art, a brief description of the operation of the engine 20 will enhance appreciation of the interrelationship of the various components by way of background for the invention to be described below. Basically, the engine 20 may be considered as comprising a core engine 21, a fan 22 including a rotatable stage of fan blades 23, and a fan turbine 24A located downstream of the core engine 21 and which is interconnected to the fan 22 by a shaft 25. The core engine 21 includes an axial flow compressor 26 having a rotor 27. Air enters inlet 28 from the left of FIG. 1 in the direction of the solid arrow and is initially compressed by the fan blades 23.

A fan cowl or nacelle 29 circumscribes the core engine 21 and is interconnected therewith by a plurality of radially outwardly extending outlet guide vane assemblies 30, (one shown) substantially equiangularly spaced apart around the core engine cowl. The prime purpose of the outlet guide vanes is to redirect the helical air flow exiting the fan blades 23 into a predominantly truly axial direction. A first portion of the relatively cool compressed air exiting the fan blades 23 enters a fan bypass duct 31 defined between the core engine 21 and the fan cowl 29, and discharges through a fan nozzle 32. A second portion of the compressed air enters core engine inlet 33, is further compressed by the axial flow compressor 26, and is discharged to a combustor 34 where it is mixed with fuel and burned to provide high energy combustion gases which drive core engine turbine 35. The turbine 35, in turn, drives the rotor 27 in the usual manner of gas turbine engines. The hot gases of combustion then pass through and drive the fan turbine which, in turn, drives the fan 22. A propulsive force is thus obtained by the action of the fan 22 discharging air from the fan bypass duct 31 through the fan nozzle 32 and by the discharge of combustion gases from core engine nozzle 37 defined, in part, by plug 38 and cowl 39 of the core engine 21.

The present invention relates to the outlet guide vane assemblies 30 of novel polymeric composite construction and to a novel method of fabrication thereof. Referring now to FIGS. 2 through 8 of the drawings, each vane assembly 30 includes an elongated airfoil vane 40 which comprises a hollow shell 41 having walls 42 and 43 which are spaced apart to define a cavity 44 therebetween (FIG. 3), and which are interconnected along the leading edge 45 and the trailing edge 46 of the vane 40. Disposed in the cavity 44 and extending the length of the shell 41 in the maximum thickness zone thereof is an elongated rib 47 formed of an elastomeric material and integral with each of the walls 42 and 43. Preferably, the rib 47 is bonded to each of the walls 42 and 43 and serves as a stiffening member to provide support for the walls 42 and 43, while at the same time providing vibration damping. It can be seen that the cavity 44 remains open on either side of the rib 47, and the hollow shell 41 is open at both ends thereof, as at 48 (FIG. 2). Preferably, a polyurethane sheath 49 covers the outer surface of the hollow shell 41 and serves to provide an erosion-resistant covering for the vane 40.

One open end 48 of the shell 41 is closed with an end plug 50 which includes an insert portion 51 having a concave inner end 52 (FIGS. 2, 6 and 7). Integral with the insert portion 51 at the outer end thereof and extending laterally outwardly therefrom is a cap flange 53 dimensioned to bear against the distal end edge of the shell 41 and be substantially flush with the peripheral surface thereof. The other end of the vane 40 is adapted to be received in a boot 55 (FIG. 2), which is mounted in core engine cowl 39. More specifically, the boot 55 has a socket insert 56 defining a cavity 57 in which the end of the vane 40 is inserted. Integral with the socket insert 56 at the upper end thereof and extending laterally outwardly therefrom is an attachment flange 58.

Mounted on the plugged end of the vane 40 is a mounting platform 60 to facilitate mounting of the vane assembly 30 in the associated turbofan engine 20. The mounting platform 60 has a substantially rectangular base plate 61 provided with an upstanding peripheral wall 62 integral therewith around the perimeter thereof. Also integral with the base plate 61 and projecting upwardly therefrom is an arcuate body 63 defining a recess or cavity 64 which is shaped complementary to but dimensioned slightly larger than the plugged end of the vane 40. The plugged end of the vane 40 is received in the cavity 64 with a predetermined clearance space therearound, which space is filled with an elastomeric encapsulant 65 (FIG. 5) which serves to bond the vane 40 to the mounting platform 60. Preferably, the encapsulant 65 is injected into the clearance space through an injection bore 66 in the arcuate body 63, as will be explained more fully below. Also integral with the base plate 61 and with the arcuate body 63 are two mounting lugs 67, each provided with a bore for receiving a complementary fastener, such as a bolt 68 and nut plate 68a (FIG. 8). Both the platform 60 and the plug 50 are preferably formed of a nylon filled with carbon fibers.

In use, the vane assembly 30 is mounted in place by inserting the free end of the vane 40 into the boot 55, which is mounted in a complementary recess (not shown) in the cowl 39 of the core engine 21, being secured in place by suitable means. The mounting platform 60 is secured by bolts 68 to the inner surface of the fan cowl 29, as illustrated in FIG. 8.

The vane assembly 30 offers the advantage of a preformed assembly which is ready for mounting in the gas turbine engine by the application of a few fasteners, and has the advantage of low weight by reason of its hollow construction. The rib 47 supports the outer aerodynamic shell 41 internally and also acts as an internal damping system preventing the independent vibration of the walls 42 and 43 of the shell 41.

Referring now also to FIGS. 9 through 13 of the drawings, the method of fabrication of the vane assembly 30 will be described. The vane 40 is first constructed from a vane preform, generally designated by the numeral 70, which includes a core assembly 71 and polymeric composite shell preforms 75 and 76. The core assembly 71 comprises the elongated rib 47 and two elongated removable mandrels 73 which are arranged to abut the rib 47 on opposite sides thereof, as illustrated in FIG. 9. The mandrels 73 cooperate with the rib 47 to form the core assembly 71 which is substantially in the aerodynamic shape of the finished vane 40. The rib 47 is formed of an elastomeric material, preferably a fluoroelastomer rubber such as that sold under the trademark VITON by E. I. DuPont de Nemours & Co. Inc. Each of the mandrels 73 is formed of a material with release characteristics so that it will not adhere to an epoxy resin during cure, the material preferably being a silicone rubber, such as that sold by General Electric Company under the trademark TUFEL.

After the core assembly 71 is assembled, the exposed surfaces of the rib 47 are lightly abraded in preparation for a subsequent bonding step. Each of the shell preforms 75 and 76 comprises a plurality of thin laminae 77 of a composite material, preferably a composite of graphite or carbon fibers and glass fibers impregnated with a thermosetting epoxy resin. In the preferred embodiment of the invention, each of the laminae 77 comprises a unidirectional hybrid 80-graphite/20-glass impregnated tape available from the 3M Company, St. Paul, Minn. Alternatively, the preforms 75 and 76 could be composites consisting of, for example, laminae of metallic foils bonded together by a suitable adhesive. The shell preforms 75 and 76 are respectively laid over the convex and concave surfaces of the core assembly 71, each of the shell preforms 75 being dimensioned to be longitudinally coterminous with the core assembly 71, but extending beyond the core assembly 71 along the leading and trailing edges thereof so that these extending portions of the shell preforms 75 and 76 overlap each other.

After the vane preform 70 is assembled, it is placed in a molding machine 80 (FIG. 10) which includes heated matched male and female dies 81 and 82, respectively. Heat and pressure are simultaneously applied to the vane preform 70 by the molding machine 80 to cure the vane preform 70 in one step. More specifically, the laminae 77 of each of the shell preforms 75 and 76 are bonded together, and the overlapping portions of the shell preforms 75 and 76 are bonded together along the leading and trailing edges of the vane 40. The inner ones of the laminae 77 are simultaneously bonded to the rib 47, but they are not bonded to the mandrels 73 because of the latter's inherent release characteristics. For the preferred materials described above, the cure cycle includes a cure of about one hour at 230° F., followed by post-curing at 275° F. for four hours. However, it will be appreciated that the curing cycle could change in the event alternate materials are used. After the vane preform 70 has been cured in the molding machine 80, the mandrels 73 are removed through one end of the hollow shell 41, as illustrated in FIG. 11. There remains the hollow vane 40 with an integral, internal, longitudinally extending stiffening rib 47 down the center thereof.

Next, the vane 40 is assembled to the mounting platform 60. Preferably, the inner surface of the cavity 64 and the end of the vane 40 to be inserted therein are abraded, as by grit blasting, the remaining surfaces of the vane 40 and the platform base plate 61 first being appropriately masked. It will be appreciated that alternative abrading techniques, such as etching, could also be used. A suitable primer is then applied to the abraded surfaces. The primer may, for example, be a mixture of primers such as those sold by the Dayton Coatings and Chemical Division and Whittaker Corporation under the trademarks THIXON 300 and THIXON 301. Primer is applied to achieve a dry film thickness of approximately 0.0003 to 0.0004 inch. The injection bore 66 is then drilled in the platform 60 or, in the alternative, is premolded into the platform 60.

The primed vane 40 and platform 60 are then preheated for about 15 minutes at a temperature of about 320° F. and then loaded into a transfer mold assembly 85 (FIG. 12) which is maintained at a temperature of about 350° F. More specifically, the vane 40 is supported in a suitable support fixture (not shown) and the insertion end is clamped in a retaining plate 84. The platform 60 is received in a complementary cavity in a mold tool 86. The retaining plate 84 is secured to the mold tool 86 so that the abraded end of the vane 40 is received in the cavity 64 of the platform 60 with a predetermined substantially uniform clearance space therearound. Preferably, the depth of insertion of the vane 40 into the cavity 64 is approximately 0.8 inch and a clearance space of approximately 0.08 inch is established between the tip of the vane 40 and the bottom of the cavity 64 by not bottoming the vane 40 in the cavity 64. Also, the sizing of the vane 40 and the cavity 64 is such that a clearance space of about 0.08 inch is established between the sides of the vane 40 and the sidewalls of the cavity 64.

The mold tool 86 has an injection sprue 87 which is disposed in alignment with the injection bore 66 through the platform 60. The sprue 87 communicates with a transfer cylinder 88 in which is disposed a piston 89. Uncured VITON elastomer is loaded into the transfer cylinder 88, which is maintained at a temperature of about 350° F., and is then injected under about 3,500 psi maximum transfer pressure through the sprue 87 and the injection bore 66 into the clearance space between the vane 40 and the platform 60. The vane/platform assembly is retained in the transfer mold assembly 85 for about 75 minutes at a temperature of about 350° F., which serves to cure the VITON elastomer 65 and securely bond the vane 40 to the platform 60. The bonded assembly is then removed from the transfer mold assembly 85 and post-cured for about 16 hours at a temperature of about 300° F., after which surplus VITON flash is removed from the platform 60 and from the vane 40.

The vane 40, after molding and the post-cure cycle has low resistance to erosion caused by debris such as sand, gravel and the like to which aircraft gas turbine engines may be exposed. Thus, the polyurethane sheath 49 is applied to the outer surface of the hollow shell 41 to provide the necessary erosion resistance. First the outer surface of the hollow shell 41 is lightly abraded, as by grit blasting, the surfaces of the mounting platform 60 and the encapsulant 65 being masked to prevent erosion thereof during the grit blasting process. Polyurethane film, approximately, 0.010 inch thick with an approximately 0.001 inch thick coating of an adhesive resin on one surface thereof, is then cut into an elongated strip of the desired size and shape. The film strip is then wrapped around the hollow shell 41, being worked down into intimate contact with the surface of the shell 41 by use of a suitable tool, such as a spatula or the like, to prevent entrapment of air or the formation of resin-rich pockets.

When the outer surface of the hollow shell 41 has been completely covered by the polyurethane sheath 49, the vane 40 is placed in a press fixture 90 (FIG. 13) for curing the adhesive. The press fixture 90 includes a convex lower member 91 and a concave upper member 92. Before insertion of the vane 40 into the press fixture 90, a pressure-intensifier envelope 93 is wrapped around the sheathed vane 40. Preferably, the envelope 93 is formed of silicone rubber and is arranged in a single-fold configuration having two flaps which respectively lie along the convex and concave surfaces of the vane 40 and overlap, as at 94, beyond the trailing edge of the vane 40. Then the assembly of the sheathed vane 40 and the pressure-intensifier envelope 93 are placed in the press fixture 90 and cured for about 60 minutes at a temperature of about 230° F. The pressure-intensifier envelope 93 serves to increase and evenly distribute the pressure applied to the sheath 49 to assure uniform curing thereof and uniform adherence to the outer surface of the shell 41. The rib 47 should provide sufficient internal support during the pressing operation but, if necessary, the hollow core 44 could be pressurized for this operation. The polyurethane sheathed vane 40 is then removed from the press fixture 90, the envelope 93 is removed and the sheathed vane 41 is post-cured in an oven for about four hours at about 275° F. Excess polyurethane film is then trimmed from the vane 41.

There results a vane assembly 30 which is of extremely light weight and inexpensive manufacture, and has improved fatigue strength and erosion resistance and high vibrational damping. Furthermore, the vane assembly 30 is characterized by excellent dimensional uniformity and an improved surface finish as well as improved fatigue resistance compared to comparable metallic airfoils. All of these advantages are obtained without the use of potentially strategic materials.

In mounting the vane assembly 30 to the turbofan engine 20, the free end of the vane 40 is inserted in the boot 55 and the platform 60 is then bolted in place on the fan cowl 29, as described above.

Referring now to FIG. 14, there is illustrated an alternative vane construction, generally designated by the numeral 100, which is essentially the same as the vane 40 except that it includes a plurality of stiffening ribs. More specifically, the vane 100 has an outer shell 101 having walls 102 and 103 which are spaced apart to define an internal cavity 104, the walls 102 and 103 being joined together along the leading and trailing edges of the vane 100. Three elongated spaced-apart stiffening ribs 105, 106 and 107 are disposed in the cavity 104, the ribs 105-107 being spaced from one another and from the interconnected edges of the walls 102 and 103. If desired, a polyurethane sheath (not shown) like the sheath 49 may be applied to the outer surface of the shell 101. The method of fabrication of the vane 100 is substantially the same as that described above for the vane 40, with the exception that the core assembly will comprise the three ribs 105-107 alternating with four removable mandrels.

From the foregoing, it can be seen that there has been provided an improved hollow vane construction with an internal rib which provides mechanical support and vibration damping, as well as a unique method of manufacturing such a vane. There have also been disclosed a method for assembling the vane to a mounting platform, resulting in an extremely light weight and low cost vane assembly with improved structural and operating characteristics.

We claim:

1. A method of fabricating a hollow airfoil comprising the steps of: providing a core assembly including an elongated support structure of one material and plural elongated mandrels of another material abutting said support structure and cooperating therewith to define the core assembly, then applying a shell around said core assembly encompassing said core assembly except at the ends thereof and contacting said support structure, then bonding said shell only to said support structure, and then removing said mandrels through an open end of said shell leaving a hollow shell with an integral internal support structure.

2. The method of claim 1, wherein said shell is formed by stacking a plurality of thin laminae of shell material on said core assembly and bonding the laminae together to form a laminated shell structure.

3. The method of claim 2, wherein each of said laminae is impregnated with a thermosetting resin, and further including the step of applying heat and pressure to the combination of the core assembly and the stacked laminae for bonding the laminae to each other and to said support structure.

4. The method of claim 3, wherein said laminated shell is formed by applying two stacks of said laminae respectively on opposite sides of said core assembly with said stacks extending beyond the leading and trailing edges of the core assembly and overlapping each other, said application of heat and pressure serving to bond the overlapping portions of said two stacks together to form a continuous shell encompassing said core assembly.

5. The method of claim 1, wherein said shell is formed by applying shell halves respectively to opposite sides of said core assembly with said shell halves extending beyond the leading and trailing edges of said core assembly and overlapping each other, and further including the step of bonding said overlapping portions of said shell halves together to form a continuous shell encompassing said core assembly.

6. The method of claim 1, wherein said support structure comprises a solid rib disposed between two of said mandrels.

7. The method of claim 6, wherein said rib is formed of an elastomeric material.

8. The method of claim 1, wherein said support structure includes a plurality of discrete solid ribs alternating with a plurality of mandrels, all of said mandrels being removed after bonding of the shell to said ribs for leaving a hollow shell with a plurality of internal spaced-apart ribs.

9. The method of claim 1, and further including the step of applying a sheath of erosion-resistant material to the outer surface of said shell.

10. The method of claim 1, wherein said mandrels are formed of silicone rubber.

11. A method of applying a mounting platform to one end of an elongated hollow airfoil, wherein the platform has a recess therein shaped complementary to but dimensioned slightly larger than the one end of the airfoil, comprising the steps of: plugging one end of said hollow airfoil, inserting said plugged end of the airfoil into the recess in the platform with a predetermined substantially uniform clearance space between the recess of said platform and the inserted end of the airfoil, then injecting an elastomeric material into the clearance space for filling same, and then curing the elastomeric material for bonding the inserted end of the airfoil to the platform.

12. The method of claim 11, wherein said elastomeric material comprises a fluoroelastomer rubber.

13. The method of claim 11, wherein said curing is achieved by simultaneous application of heat and pressure to elastomeric material.

14. A method of fabricating a hollow airfoil assembly comprising the steps of: providing a core assembly including an elongated support structure of one material and plural elongated mandrels of another material abutting said support structure and cooperating therewith to define the core assembly, then applying a shell around said core assembly encompassing said core assembly except at the ends thereof and contacting said support structure, then bonding said shell only to said support structure, then removing said mandrels through one open end of said shell leaving a hollow shell with an integral internal support structure and open ends, plugging one open end of said shell, providing a mounting platform having a recess therein shaped complementary to but dimensioned slightly larger than the plugged end of the shell, inserting the plugged end of the shell into the recess in the platform with a substantially uniform predetermined clearance space between the platform and the inserted end of the shell, then injecting an elastomeric material into the clearance space for filling same, and then curing the elastomeric material for bonding the inserted end of the shell to the platform.

15. The method of claim 14, wherein said support structure comprises a solid rib disposed between two of said mandrels.

16. The method of claim 15, wherein said rib is formed of an elastomeric material.

17. The method of claim 14, wherein said support structure includes a plurality of discrete solid ribs alternating with a plurality of mandrels, all of said mandrels being removed after bonding of the shell to said ribs for leaving a hollow shell with a plurality of internal spaced-apart ribs.

18. The method of claim 14, and further including the step of applying a sheath of erosion-resistant material to the outer surface of said shell.

* * * * *